US009677449B2

(12) United States Patent
Adamson et al.

(10) Patent No.: US 9,677,449 B2
(45) Date of Patent: Jun. 13, 2017

(54) SYSTEM FOR CONTROLLING THE TEMPERATURE OF AN EXHAUST REDUCTANT USED WITHIN AN EXHAUST TREATMENT SYSTEM OF A WORK VEHICLE

(71) Applicant: CNH Industrial America, LLC, New Holland, PA (US)

(72) Inventors: William Adamson, Naperville, IL (US); Eran Salzman, Glenview, IL (US)

(73) Assignee: CNH Industrial America LLC, New Holland, PA (US)

( * ) Notice: Subject to any disclaimer, the term of this patent is extended or adjusted under 35 U.S.C. 154(b) by 0 days.

(21) Appl. No.: 14/520,419

(22) Filed: Oct. 22, 2014

(65) Prior Publication Data
US 2015/0176467 A1    Jun. 25, 2015

Related U.S. Application Data

(60) Provisional application No. 61/917,967, filed on Dec. 19, 2013.

(51) Int. Cl.
*F01N 3/00* (2006.01)
*F01N 9/00* (2006.01)
(Continued)

(52) U.S. Cl.
CPC ............... *F01N 9/00* (2013.01); *F01N 3/208* (2013.01); *F01N 3/2896* (2013.01);
(Continued)

(58) Field of Classification Search
CPC .......... F01N 9/00; F01N 3/208; F01N 3/2896; F01N 3/2066; F01N 2450/16;
(Continued)

(56) References Cited

U.S. PATENT DOCUMENTS 7,156,239 B2    1/2007   Klotz
8,234,854 B2    8/2012   Kesse et al.
(Continued)

FOREIGN PATENT DOCUMENTS

EP         2299199 A2     3/2011
WO     WO 9938426 A1     8/1999
(Continued)

OTHER PUBLICATIONS

Fleet Pro DEF Website. Diesel Exhaust Fluid (DEF) One page. Dated: May 21, 2012.
(Continued)

*Primary Examiner* — Phutthiwat Wongwian
*Assistant Examiner* — Kelsey Stanek
(74) *Attorney, Agent, or Firm* — Rickard K. DeMille; Rebecca L. Henkel

(57) ABSTRACT

In one aspect, a system for controlling the temperature of an exhaust reductant used within an exhaust treatment system of a work vehicle may generally include a tank having a plurality of walls defining an enclosed volume for containing the exhaust reductant. The tank may also include a threaded port defined through a first wall of the plurality of walls. The system may also include an electric heating device having a mounting portion and a heating element. The mounting portion may be configured to be screwed into the threaded port to couple to the electric heating device to the tank. In addition, the system may include a controller communicatively coupled to the electric heating device that is configured to control the operation of the electric heating device based on a temperature associated with the tank.

20 Claims, 6 Drawing Sheets

(51) Int. Cl.
 *F01N 3/28* (2006.01)
 *F01N 3/20* (2006.01)
(52) U.S. Cl.
 CPC ........ *F01N 3/2066* (2013.01); *F01N 2450/16* (2013.01); *F01N 2590/08* (2013.01); *F01N 2610/02* (2013.01); *F01N 2610/10* (2013.01); *F01N 2610/105* (2013.01); *F01N 2610/1406* (2013.01); *F01N 2610/1486* (2013.01); *F01N 2900/18* (2013.01); *F01N 2900/1811* (2013.01); *Y02T 10/47* (2013.01)
(58) Field of Classification Search
 CPC ............. F01N 2590/08; F01N 2610/02; F01N 2610/10; F01N 2610/105; F01N 2610/1406; F01N 2610/1486; F01N 2900/18; F01N 2900/1811
 USPC ...................................... 60/272–324; 392/441
 See application file for complete search history.

(56) References Cited

U.S. PATENT DOCUMENTS

| | | |
|---|---|---|
| 8,328,549 B2 | 12/2012 | Galati et al. |
| 8,387,371 B2 | 3/2013 | Zhang et al. |
| 2007/0157602 A1 | 7/2007 | Gschwind |
| 2008/0256937 A1* | 10/2008 | Suzuki .................... F01N 3/105 60/300 |
| 2009/0188923 A1* | 7/2009 | Versaw, Jr. ............ B60K 13/04 220/564 |
| 2010/0162690 A1* | 7/2010 | Hosaka ................. F01N 3/2066 60/295 |
| 2011/0283689 A1 | 11/2011 | Wilkins |
| 2012/0103433 A1 | 5/2012 | Koonce |
| 2012/0160934 A1 | 6/2012 | Ponnathpur et al. |
| 2012/0275773 A1* | 11/2012 | Floyd .................... F01N 3/2066 392/441 |
| 2012/0305089 A1 | 12/2012 | Larsson |
| 2013/0000729 A1 | 1/2013 | Mokire et al. |
| 2013/0014492 A1 | 1/2013 | Basista et al. |
| 2013/0263945 A1 | 10/2013 | Landes |
| 2013/0318950 A1 | 12/2013 | Gottwald |

FOREIGN PATENT DOCUMENTS

| | | |
|---|---|---|
| WO | 2008/138757 | 11/2008 |
| WO | 2010/110669 | 9/2010 |
| WO | WO 2011015362 A1 | 2/2011 |
| WO | WO 2011/078692 A1 | 6/2011 |

OTHER PUBLICATIONS

Cummins. Diesel Exhaust Fluid (DEF)—Q&A. 8 Pages. Dated: 2009.
LykinsSoil. Lykins specialty Products—BLUEDEF. 2 pages. Dated:2010.
Chromalox. Small Tank Applications. 2 Pages. Dated: 2008-2014.
European Search Report for EP Application No. 14199077.0 issued Jun. 17, 2015 (7 pages).

* cited by examiner

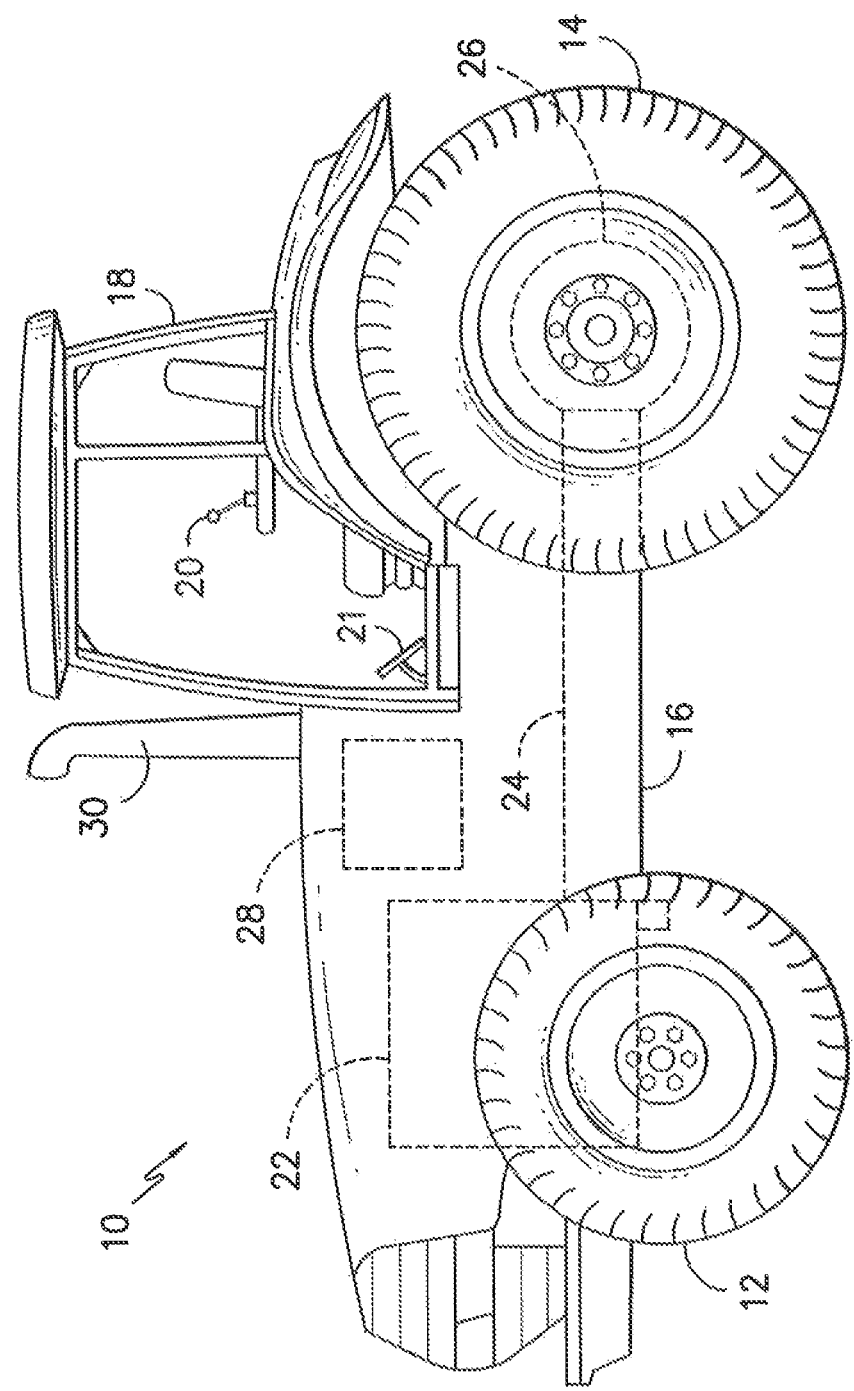
FIG. -1-

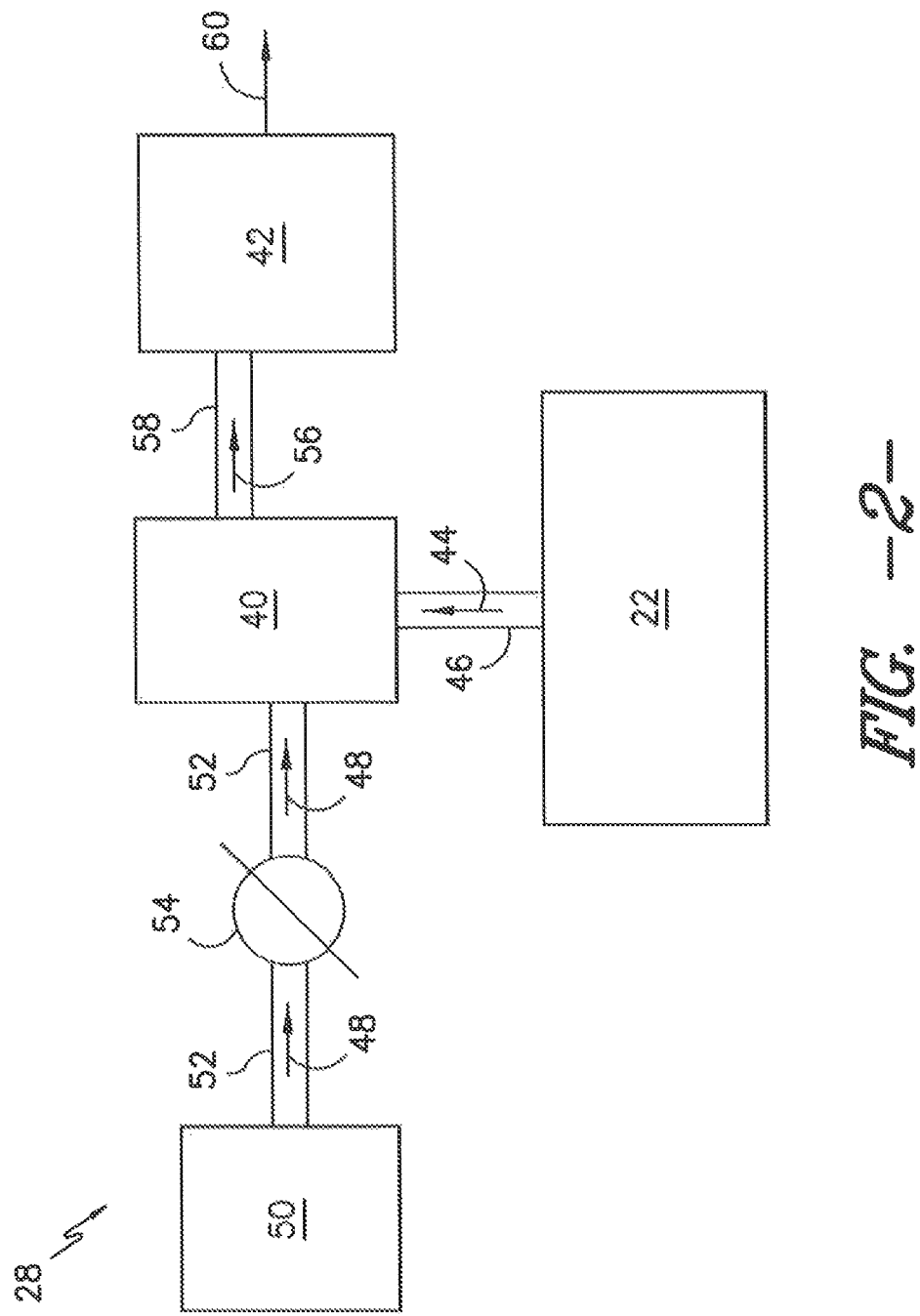
FIG. -2-

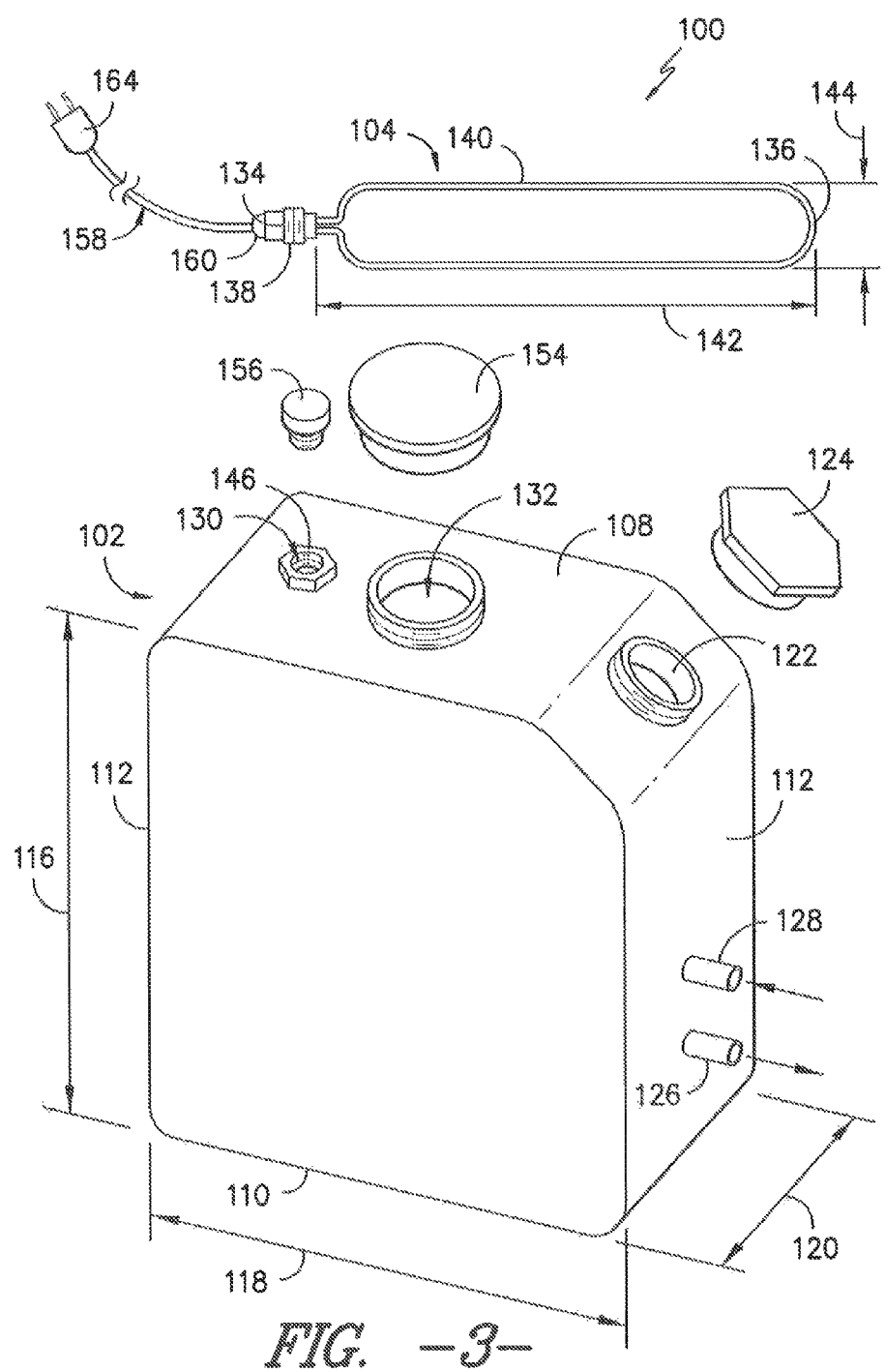
FIG. -3-

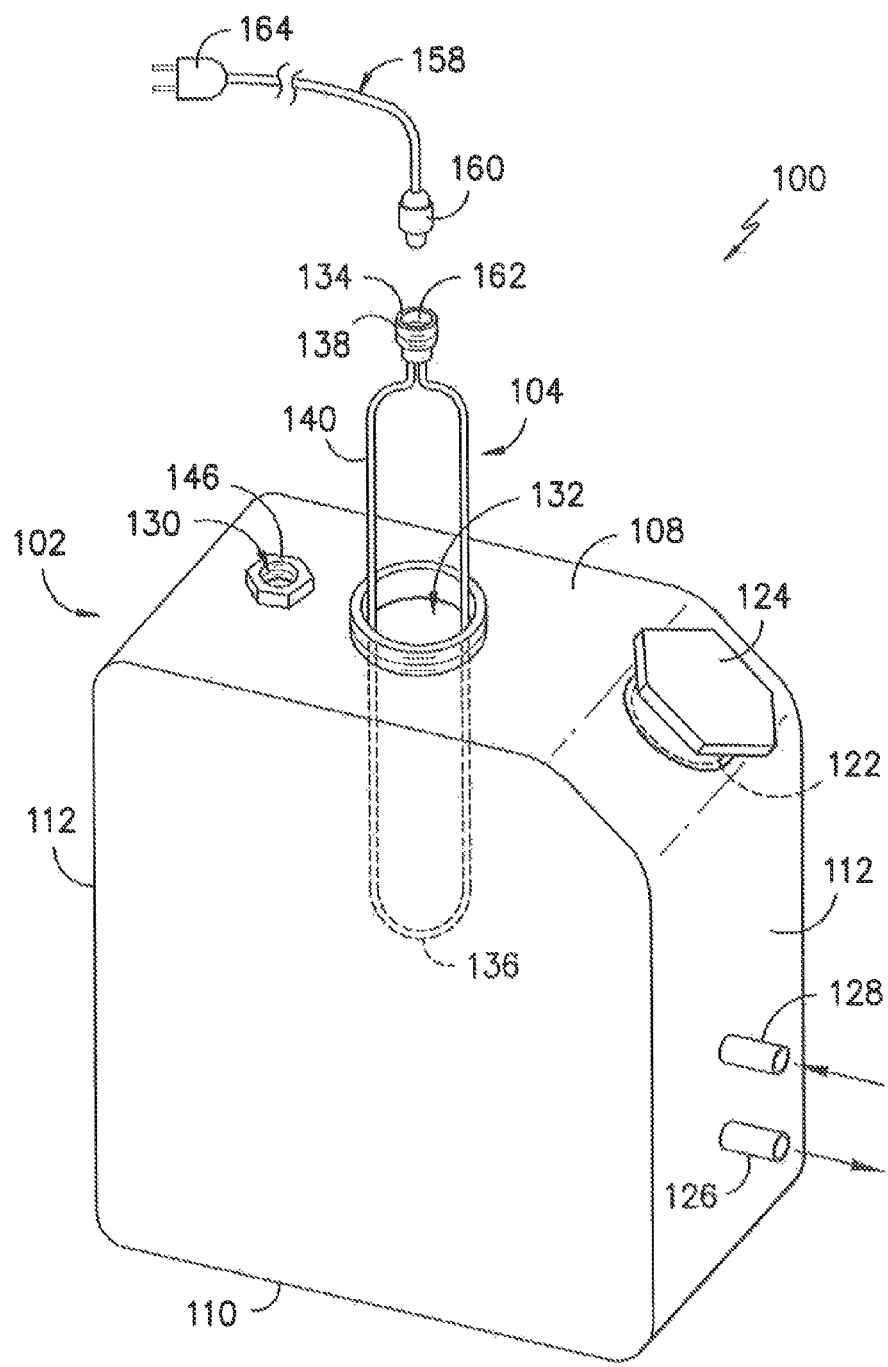
FIG. -4-

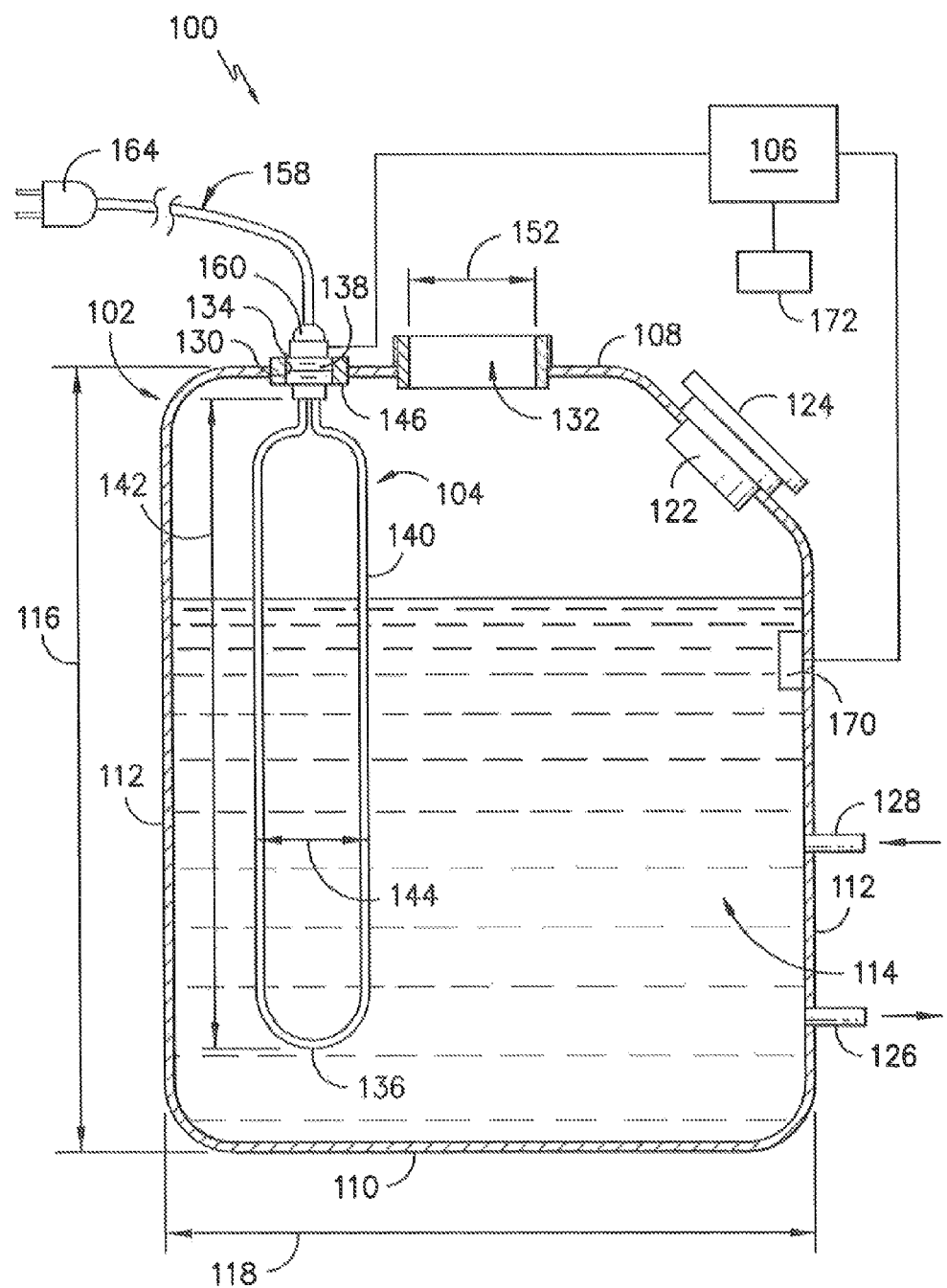
FIG. -5-

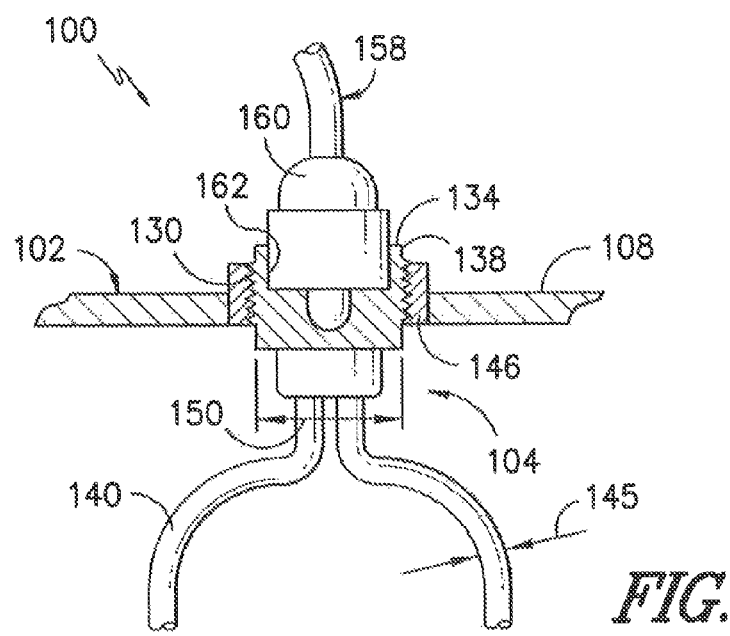
FIG. -6-
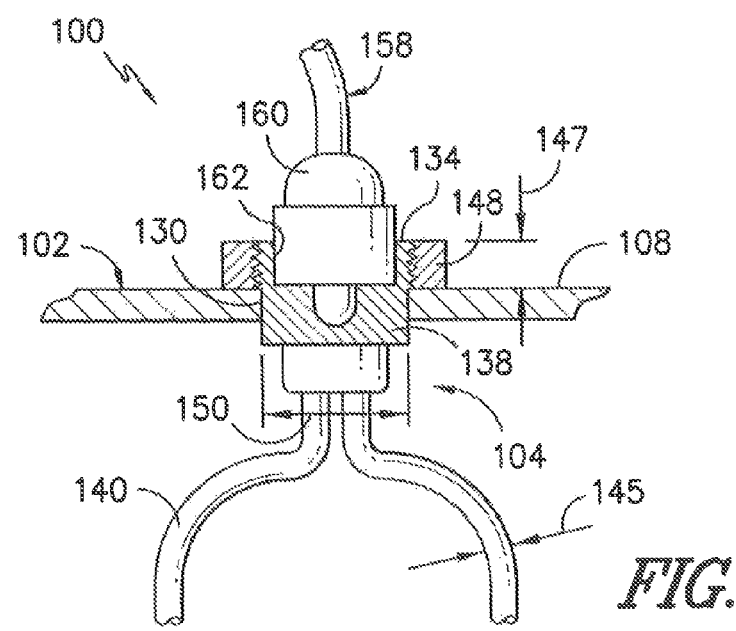
FIG. -7-

SYSTEM FOR CONTROLLING THE TEMPERATURE OF AN EXHAUST REDUCTANT USED WITHIN AN EXHAUST TREATMENT SYSTEM OF A WORK VEHICLE

FIELD OF THE INVENTION

The present subject matter relates generally to a system for controlling the temperature of an exhaust reductant used within an exhaust treatment system of a work vehicle and, more particularly, to a reductant tank and associated electric heating device configured to be mounted to and extend within tank for heating the exhaust reductant contained therein.

BACKGROUND OF THE INVENTION

Typically, work vehicles, such as tractors and other agricultural vehicles, include an exhaust treatment system for controlling engine emissions. As is generally understood, exhaust treatment systems for work vehicles often include a diesel oxidation catalyst (DOC) system in fluid communication with a selective catalytic reduction (SCR) system. The DOC system is generally configured to oxidize carbon monoxide and unburnt hydrocarbons contained within the engine exhaust and may include a mixing chamber for mixing an exhaust reductant, such as a diesel engine fluid (DEF) reductant or any other suitable urea-based fluid, into the engine exhaust. For instance, the exhaust reductant is often pumped from a reductant tank mounted on and/or within the vehicle and injected onto the mixing chamber to mix the reductant with the engine exhaust. The resulting mixture may then be supplied to the SCR system to allow the reductant to be reacted with a catalyst in order to reduce the amount of nitrous oxide (NOx) emissions contained within the engine exhaust.

During winter and/or at locations with colder climates, there have been issues with the exhaust reductant freezing within the reductant tank when the work vehicle is not operated over a given period of time (e.g., overnight). When this occurs, the exhaust reductant must be thawed prior to the vehicle being operated. Current heating solutions typically include a fluid conduit extending within the reductant tank that is configured to circulate warm engine coolant through the tank, thereby allowing the reductant contained therein to be heated. However, since it takes the engine coolant a substantial period of time to heat up (particularly at very low operating temperatures), the thawing process is relatively slow and, thus, can result in significant vehicle downtime.

Accordingly, an improved system for heating the exhaust reductant contained within the reductant tank of a work vehicle would be welcomed in the technology.

BRIEF DESCRIPTION OF THE INVENTION

Aspects and advantages of the invention will be set forth in part in the following description, or may be obvious from the description, or may be learned through practice of the invention.

In one aspect, the present subject matter is directed to a system for controlling the temperature of an exhaust reductant used within an exhaust treatment system of a work vehicle. The system may generally include a tank having a plurality of walls defining an enclosed volume for containing the exhaust reductant. The tank may also include a threaded port defined through a first wall of the plurality of walls. The system may also include an electric heating device extending lengthwise within the tank between a first end and a second end. The electric heating device may include a mounting portion at the first end and a heating element extending between the mounting portion and the second end. The mounting portion may be configured to be screwed into the threaded port to couple to the electric heating device to the tank. In addition, the system may include a controller communicatively coupled to the electric heating device that is configured to control the operation of the electric heating device based on a temperature associated with the tank.

In another aspect, the present subject matter is directed to a system for controlling the temperature of an exhaust reductant used within an exhaust treatment system of a work vehicle. The system may generally include a tank defining an enclosed volume for containing the exhaust reductant. The tank may include a top wall, a bottom wall and sidewalls extending between the top and bottom walls. The tank may define a height between the top and bottom walls and may also include a heater port defined through top wall. The system may also include an electric heating device extending lengthwise within the tank between a first end and a second end. The electric heating device may include a mounting portion at the first end and a heating element extending between the mounting portion and the second end. The mounting portion may be configured to be coupled to the tank via the heater port. The heating element may define a length between the mounting portion and the second end. In addition, the system may include a controller communicatively coupled to the electric heating device that is configured to control the operation of the electric heating device based on a temperature associated with the tank. Moreover, the length of the heater element may correspond to a distance that is greater than 50% of the height of the tank.

In a further aspect, the present subject matter is directed to a system for controlling the temperature of an exhaust reductant used within an exhaust treatment system of a work vehicle. The system may generally include a tank having a plurality of walls defining an enclosed volume for containing the exhaust reductant. The tank may also include a heater port defined through one of the plurality of wall. The heater port may define a first crosswise width. The system may also include an electric heating device extending lengthwise within the tank between a first end and a second end. The electric heating device may include a mounting portion at the first end and a heating element extending between the mounting portion and the second end. The mounting portion may be configured to be coupled to the tank via the heater port. The heating element may define a second crosswise width. In addition, the system may include a controller communicatively coupled to the electric heating device that is configured to control the operation of the electric heating device based on a temperature associated with the tank. Moreover, the first crosswise width may be less than the second crosswise width.

These and other features, aspects and advantages of the present invention will become better understood with reference to the following description and appended claims. The accompanying drawings, which are incorporated in and constitute a part of this specification, illustrate embodiments of the invention and, together with the description, serve to explain the principles of the invention.

BRIEF DESCRIPTION OF THE DRAWINGS

A full and enabling disclosure of the present invention, including the best mode thereof, directed to one of ordinary skill in the art, is set forth in the specification, which makes reference to the appended figures, in which:

FIG. 1 illustrates a side view of one embodiment of a work vehicle in accordance with aspects of the present subject matter;

FIG. 2 illustrates a schematic view of one embodiment of an exhaust treatment system suitable for use within a work vehicle in accordance with aspects of the present subject matter;

FIG. 3 illustrates a perspective view of various components of one embodiment of a system for controlling the temperature of an exhaust reductant used within an exhaust treatment system of a work vehicle in accordance with aspects of the present subject matter;

FIG. 4 illustrates another perspective view of the system shown in FIG. 4, particularly illustrating an electric heating device of the system being inserted within a reductant tank of the system;

FIG. 5 illustrates a side, cross-sectional view of the system shown in FIGS. 3 and 4 after the electric heating device has been installed within the reductant tank, particularly illustrating a controller of the system communicatively coupled to the heating device for automatically controlling the operation of the heating device;

FIG. 6 illustrates a close-up, cross-sectional view of a portion of the system shown in FIG. 5, particularly illustrating one embodiment of an attachment configuration for attaching the heating device to the reductant tank; and FIG. 7 illustrates another close-up, cross-sectional view of a portion of the system shown in FIG. 5, particularly illustrating another embodiment of an attachment configuration for attaching the heating device to the reductant tank.

DETAILED DESCRIPTION OF THE INVENTION

Reference now will be made in detail to embodiments of the invention, one or more examples of which are illustrated in the drawings. Each example is provided by way of explanation of the invention, not limitation of the invention. In fact, it will be apparent to those skilled in the art that various modifications and variations can be made in the present invention without departing from the scope or spirit of the invention. For instance, features illustrated or described as part of one embodiment can be used with another embodiment to yield a still further embodiment. Thus, it is intended that the present invention covers such modifications and variations as come within the scope of the appended claims and their equivalents.

In general, the present subject matter is directed to a system for controlling the temperature of an exhaust reductant used within an exhaust treatment system of a work vehicle. In particular, the system may include a reductant tank for containing the exhaust reductant and a heating device coupled to and extending within the tank for heating the exhaust reductant. In several embodiments, the heating device may comprise an electric heating device and may be configured to be coupled to the tank via a heater port defined through one of the tank walls. For instance, in one embodiment, the heater port may correspond to a threaded port (e.g., defined by a threaded insert mounted within the tank wall or by a molded feature of the tank) into which the heating device may be screwed in order to couple the device to the tank.

By including an electric heating device within the reductant tank, the temperature of the exhaust reductant may be controlled at any time that an electric power source is available, including on-board power sources of the work vehicle (e.g., a battery or alternator of the vehicle) and/or an external power source. Of particular importance, the electric heating device may be used to control the temperature of the exhaust reductant when the work vehicle is not being operated, thereby allowing the disclosed system to prevent freezing of the exhaust reductant over such periods of time. For instance, at the end of the work day, the electric heating device may be coupled to a suitable power source (e.g., an electric wall outlet via a suitable power cord) to allow the reductant temperature to be regulated overnight.

As will be described below, the disclosed system may also include a controller configured to be communicatively coupled to the heating device, thereby allowing the operation of the heating device to be electronically controlled. In addition, the controller may be communicatively coupled to one or more temperature sensors. For instance, in one embodiment, the system may include both a reductant temperature sensor configured to monitor the temperature of the exhaust reductant contained within the tank and an ambient air temperature sensor configured to monitor the temperature of the ambient air around the tank. In such an embodiment, the controller may be configured to automatically control the operation of the heating device based on the temperature measurements provided by one or more of the sensors. For example, if the temperature of the exhaust reductant falls below a given temperature threshold, the controller may be configured to turn the heating device on to allow the reductant temperature to be increased. Alternatively (or in addition thereto), if the ambient air temperature falls below a given temperature threshold, the controller may be configured to turn the heating device on to ensure that the exhaust reductant is maintained at a suitable temperature.

Referring now to the drawings, FIG. 1 illustrates a side view of one embodiment of a work vehicle 10. As shown, the work vehicle 10 is configured as an agricultural tractor. However, in other embodiments, the work vehicle 10 may be configured as any other suitable work vehicle known in the art, such as various other agricultural vehicles, earth-moving vehicles, road vehicles, all-terrain vehicles, off-road vehicles, loaders and/or the like.

As shown in FIG. 1, the work vehicle 10 includes a pair of front wheels 12, a pair or rear wheels 14 and a chassis 16 coupled to and supported by the wheels 12, 14. An operator's cab 18 may be supported by a portion of the chassis 16 and may house various control devices 20, 21 (e.g., levers, pedals, control panels and/or the like) for permitting an operator to control the operation of the work vehicle 10. Additionally, the work vehicle 10 may include an engine 22 and a transmission 24 mounted on the chassis 16. The transmission 24 may be operably coupled to the engine 22 and may provide variably adjusted gear ratios for transferring engine power to the wheels 14 via a differential 26.

Moreover, the work vehicle 10 may also include an exhaust treatment system 28 for reducing the amount emissions contained within the engine exhaust. For instance, engine exhaust expelled from the engine 22 may be directed through the exhaust treatment system 28 to allow the levels of nitrous oxide (NOx) emissions contained within the exhaust to be reduced significantly. The cleaned exhaust gases may then be expelled from the exhaust treatment system 28 into the surrounding environment via an exhaust pipe 30 of the work vehicle 10.

It should be appreciated that the configuration of the work vehicle 10 described above and shown in FIG. 1 is provided only to place the present subject matter in an exemplary field of use. Thus, it should be appreciated that the present subject matter may be readily adaptable to any manner of work vehicle configuration 10. For example, in an alternative embodiment, a separate frame or chassis may be provided to which the engine 22, transmission 24, and differential 26 are coupled, a configuration common in smaller tractors. Still other configurations may use an articulated chassis to steer the work vehicle 10, or rely on tracks in lieu of the wheels 12, 14. Additionally, although not shown, the work vehicle 10 may also be configured to be operably coupled to any suitable type of work implement, such as a trailer, spray boom, manure tank, feed grinder, plow and/or the like.

Referring now to FIG. 2, a schematic diagram of one embodiment of an exhaust treatment system 28 suitable for use with a work vehicle 10 is illustrated in accordance with aspects of the present subject matter. As shown, the exhaust treatment system 28 generally includes a diesel oxidation catalyst (DOC) system 40 in fluid communication with a selective catalytic reduction (SCR) system 42. As is generally understood, the DOC system 40 may include one or more catalysts (not shown) that serve to oxidize the carbon monoxide and unburnt hydrocarbons contained within engine exhaust 44 received from the vehicle's engine 22. For instance, as shown in FIG. 2, a suitable exhaust conduit 46 may be coupled between the engine 22 and the DOC system 40 to allow engine exhaust 44 to be directed into the DOC system 40. In addition, the DOC system 40 may define a mixing chamber (not shown) configured to allow the engine exhaust 44 to be mixed with at least one reductant 48, such as a diesel exhaust fluid (DEF) reductant or any other suitable urea-based reductant. As is generally understood, the reductant 48 may be stored within a reductant tank 50 mounted on and/or within the work vehicle 10. In such an embodiment, a suitable fluid conduit 52 may be provided between the DOC system 40 and the reductant tank 50 for supplying the reductant 48 to the DOC system 40. As shown in FIG. 2, in one embodiment, a pump 54 or other suitable transfer mechanism may be associated with the fluid conduit 52 for transferring the reductant 48 from the tank 50 to the DOC system 40. The reductant 48 may then be mixed together with the engine exhaust 44 flowing through the DOC system 40 and the resulting mixture 56 may be supplied to the downstream SCR system 42 (e.g., via a suitable conduit 58).

As is generally understood, the SCR system 42 may be configured to reduce the amount of nitrous oxide (NOx) emissions contained within the flow of engine exhaust 44 using a suitable catalyst (not shown) that reacts with the reductant 48 to convert the NOx emissions into nitrogen, water and carbon dioxide ($CO_2$). The cleaned exhaust flow 60 may then be discharged from the SCR system 42 and expelled into the surrounding environment (e.g., the vehicle's exhaust pipe 30).

Referring now to FIGS. 3-6, one embodiment of a system 100 for controlling the temperature of an exhaust reductant used within an exhaust treatment system of a work vehicle is illustrated in accordance with as aspects of the present subject matter. Specifically, FIGS. 3 and 4 illustrate perspective views of various components of the system 100. FIG. 5 illustrates a cross-sectional side view of the system 100 shown in FIGS. 3 and 4 with the system components installed. Additionally, FIG. 6 illustrates a close-up, cross-sectional view of a portion of the system 100 shown in FIG. 5.

As shown, the system 100 may generally include a reductant tank 102 (e.g., tank 50 of FIG. 2) for containing an exhaust reductant and a heating device 104 configured to be operatively associated with the tank 102 for heating the exhaust reductant contained therein. In addition, the system 100 may include a controller 106 (FIG. 5) communicatively coupled to the heating device 104 to allow the device 104 to be automatically controlled based on a temperature associated with the tank 102.

In general, the reductant tank 102 may comprise any suitable tank or vessel that is configured to contain the exhaust reductant. For instance, as shown in the illustrated embodiment, the tank 102 may be configured as a molded or pre-formed component including a top wall 108, a bottom wall 110 and sidewalls 112 extending between the top and bottom walls 108, 110. The various walls 108, 110, 112 may generally be configured to define an open volume 114 (FIG. 5) within the interior of the tank 102 for containing the exhaust reductant.

It should be appreciated that the tank 102 may generally be configured to have any suitable dimensions (e.g., a height 116, a width 118 and a depth 120) that allow for the open volume 114 to be defined therein. Of course, such dimensions may generally vary from tank-to-tank depending on, for example, the desired reductant capacity of the tank 102 and/or the storage requirements of the work vehicle. 10 (e.g., due to under-hood space limitations). It should also be appreciated that the tank 102 may generally be configured to be formed any suitable material. For instance, in several embodiments, the tank 102 may be formed from a suitable polymer material or a metal material.

In addition, the reductant tank 102 may include one or more tank openings or ports defined through one or more its walls 108, 110, 112 for accessing the interior of the tank 102 and/or for installing one or more system components within the tank 102. For example, as shown in FIGS. 3-5, the tank 102 may include an inlet port 122 defined through a portion of the top wall 108 (or at any other suitable location) for filling the tank 102 with exhaust reductant. In such an embodiment, the tank 102 may also include an inlet cap 124 associated therewith for covering or closing the inlet port 122 when reductant is not being supplied to the tank 102. In addition, the tank 102 may include an outlet port 126 defined through one of the walls 108, 110, 112 for removing the exhaust reductant, from the tank 102. For instance, as indicated above, a fluid conduit (e.g., fluid conduit 52 of FIG. 2) may be coupled between the tank 102 and the DOC system 40 of the exhaust treatment system 28. In such an embodiment, the outlet port 126 may be configured to be in fluid communication with the fluid conduit to allow the exhaust reductant to be pumped from the tank. 1.02 to the DOG system 400 for subsequent mixing with the engine exhaust. As shown in the illustrated embodiment, the tank 102 may also include a recirculation port 128 for allowing excess exhaust reductant to be returned back to the tank 102. Moreover, as will be described below, the tank. 102 may also include a heater port 130 configured for mounting the heating device 104 within the tank 102 and/or a secondary port 132 for installing the heating device 104 within the tank 102.

It should be appreciated that the outlet and recirculation ports 126, 128 shown in FIGS. 3-5 are simply illustrated as one example of suitable means for discharging exhaust reductant from the tank 102 (i.e., via the outlet port 126) and recirculating exhaust reductant back into the tank 102 (i.e., via the recirculation port 128). However, in other embodiments, the tank 102 may be configured to include any other suitable means for discharging and/or recirculating the reductant. For instance, as is generally understood, the tank 102 may be configured to receive a fluid or reductant sending unit (not shown) having one or more conduits for discharging and/or recirculating the reductant. Such sending units may also include a fluid level sensor that allows the level of the reductant within the tank 102 to be monitored. In such embodiments, the reductant sending unit may be mounted, for example, within a single port defined through the tank 102 (e.g., the secondary port 132) and may be configured to extend lengthwise within the interior of the tank 102.

In general, the heating device 104 of the disclosed system 100 may comprise any suitable device known in the art that is capable of being utilized to control the temperature of the exhaust reductant within the tank 102. However, as indicated above, in several embodiments, the heating device 104 may correspond to an electric heater. By using an electric heater, the exhaust reductant may be heated without the need to supply warmed engine coolant to the tank 102. As a result, the heating device 104 may be utilized when the work vehicle 10 is not being operated. In addition, the amount of time required to bring the electric, heating device 104 up to temperature may be significantly less than the amount of time required to warm the engine coolant, thereby reducing vehicle downtime in instances when the exhaust reductant must be thawed from a frozen state.

As particularly shown in FIGS. 3-5, the heating device 104 may generally be configured to extend lengthwise between a first end 134 and a second end 136 and may include a mounting portion 138 disposed at the first end 134 and an electric heating element 140 extending between the mounting portion 138 and the second end 136. As is generally understood, the heating element 140 may be configured to be formed from any suitable material that allows electricity to be converted to heat via resistive heating. However, in several embodiments, it may be desirable to form the heating element 140 from a material that will not corrode when exposed to the exhaust reductant. For instance, in one embodiment, the heating element 140 may be formed from stainless steel or an other suitable anti-corrosion material.

It should also be appreciated that the heating element 140 may generally be configured to define any suitable dimensions. For instance, as shown in FIGS. 3 and 5, the heating element may define a length 142 extending between the mounting portion 138 and the second end 136 of the heating device 104. In several embodiments, the length 142 may correspond to a distance that is greater than 50% of the height 116 defined by the tank 102. Specifically, in one embodiment, the length 142 may correspond to a distance that is greater than 60% of the height 116 of the reductant tank 102, such as a distance that is greater than 70% of the height 116 or greater than 80% of the height 116 or greater than 90% of the height 116. By configuring the heating element 140 to extend along a substantial portion of the height 116 of the tank 102, the heating element 140 may be exposed to a larger percentage of the exhaust reductant, thereby increasing its heating capability. In addition, as shown in FIGS. 3 and 5, the heating element 140 may also define an overall crosswise width 144. As will be described below, the crosswise width 144 selected for the heating element 140 may impact the manner in which the heating device 104 must be installed within the tank 102.

The individual coil(s) of the heating element 140 may also be configured to define any suitable cross-wise dimension 145 (FIGS. 6 and 7) depending, at least in part, on the overall size of the tank 102. For instance, in several embodiments, the coil(s) may define a diameter ranging from about 0.25 inches to about 1.5 inches, such as from about 0.25 inches to about 1 inch or from about 0.5 inches to about 1.25 inches and any other subranges therebetween. However, in other embodiments, the coil diameter may be less than 0.25 inches or greater than 1.5 inches. It should be appreciated that, by configuring the cross-wise dimension 145 of the coil(s) to be relatively large, the heating surface area of the heating element 140 may be increased, thereby increasing the effectiveness of the element 140 in heating the exhaust reductant.

Moreover, it should be appreciated that the heating element 140 may generally be configured to have any suitable shape or coil configuration. For instance, as shown in the illustrated embodiment, the heating element 140 generally includes a single heating coil having a looped configuration extending linearly between the mounting portion 138 and the second end 136 of the heating device 104 However, in other embodiments, the heating element 140 may have any other suitable coil configuration, such as a spiraled configuration or an "L-shaped" configuration, and/or may include any other suitable number of heating coils, such as two or more heating coils.

Additionally, the mounting portion 138 of the heating device 104 may generally have any suitable configuration that allows it to be mounted to the tank 102. In several embodiments, the mounting portion 138 may be configured to be coupled to the tank via a heater port 130 defined through one of the tank walls. For instance, as shown in the illustrated embodiment, the heater port 130 is defined through the top wall 108 of the tank 102. As such, when the mounting portion 138 is coupled to the tank 102 via the heater port 130, the heating device 104 may generally be configured to extend vertically within the tank 102. However, in other embodiments, the heater port 130 may be defined at any other suitable location. For instance, in an alternative embodiment, the heater port 130 may be defined through one of the sidewalls 112 so that the heating device 104 extends horizontally within the tank 102 when the mounting portion 138 is coupled to and/or within the heater port 130.

In several embodiments, the mounting portion 138 may be configured to be coupled to and/or within the heater port 130 via a threaded connection. For instance, the heater port 130 may correspond to a threaded port or opening defined by a threaded feature 146 mounted within and/or formed by the tank wall 108. Specifically, as shown in the illustrated embodiment, the threaded feature 146 may correspond to a threaded insert (e.g., an attachment nut) mounted within the tank wall 108. Alternatively, the threaded feature 146 may be formed integrally with the tank wall 108, such as by molding the threaded feature 146 into the tank 10. Regardless, the mounting portion 138 may be configured to define corresponding threads around its outer perimeter such that the mounting portion 138 may be screwed into the heater port 130 in order to secure the heating device 104 to the tank 102.

Alternatively, the mounting portion 138 may be configured to be coupled to the tank 102 using any other suitable means. For instance, FIG. 7 illustrates a cross-sectional view showing a different attachment configuration for the heating device 104. As shown, the mounting portion 138 may be configured to be inserted through the heater port 130 such that the first end 134 of the heating device 104 extends above the upper surface of the tank wall 108 by a given distance 147. In such an embodiment, a suitable attachment mechanism 148 (e.g., a threaded nut) may be coupled to the top end of the mounting portion 138 to hold the heating device 104 in place relative to the tank 102.

It should be appreciated that, when installing the heating device 104 within the tank 102, the specific installation method used may generally vary depending on the respective widths of the heating element 140 and the heater port 130. For instance, as indicated above, the heating element 140 may define a crosswise width 144. Additionally, as shown in FIGS. 6 and 7, the heater port 138 may also define a crosswise width 150. In embodiments in which the crosswise width 144 of the heating element 140 is less than the crosswise width 150 of the heater port 138, the heating device 104 may simply be configured to be installed within the tank 102 by inserting the heating element 140 through the heater port 130. However, it may often be desirable for the heating device 104 to include a larger heating element that what can be accommodated via insertion through the heater port 130 in order to increase the heating capacity of the device 104. In such embodiments, as indicated above, the tank 102 may include a secondary port 132 defined therein for receiving such larger heating elements.

For instance, as shown in the illustrated embodiment, the secondary port 132 may be formed through the top wall 108 of the tank 102 and may define a crosswise width 152 (FIG. 5) that is greater than the crosswise width 144 defined by the heating element 140. As such, the heating element 140 may be inserted through the secondary port 132 in order to install the heating device 104 within the tank 102. For example, as particularly shown in FIG. 4, the heating element 140 may be configured to be inserted vertically through the secondary port 132. After inserting the entire heating device 104 within the tank 102 via the secondary port 132, the heating device 104 may then be moved laterally to vertically align the mounting portion 138 with the heater port 130, thereby allowing the mounting portion 138 to be screwed into the heater port 130 and/or inserted through the heater port 130 for attachment to the tank 102 via an suitable attachment mechanism 148 (e.g., the threaded nut shown in FIG. 7).

It should be appreciated that the secondary port 132 may correspond to any suitable pre-existing port defined in the tank 102 or a new port defined therein specifically for the purpose of installing the disclosed heating device 104. For instance, as indicated above, the secondary port 132 may correspond to a pre-existing port configured for receiving and/or mounting a fluid or reductant sending unit (not shown) within the tank 102. In such embodiments, the sending unit may, for example, include an end cap configured to engage and/or be mounted within the secondary port 132 for coupling the sending unit to the tank 102. Accordingly, the sending unit may be required to be removed to allow the heating device 104 to be installed within the tank 102. Upon installation of the heating device 104, the sending unit may then be reinserted within the tank 102 and mounted thereto via the secondary port 132.

Alternatively, in embodiments in which the tank 102 does not include a sending unit or other suitable component designed to be mounted within the secondary port 132, the tank 102 may include a suitable end cap or plug 154 (FIG. 3) configured to be inserted within the secondary port 132 to cover the opening when the port 132 is not being used to install the heating device 104 within the tank 102. Similarly, as shown in FIG. 3, the tank 102 may also include an end cap or plug 156 configured to cover the opening defined by the heater port 130 when the heating device 104 is not installed within the tank 102.

It should also be appreciated that the heating device 104 may generally be configured to receive electrical power from any suitable power source and/or using any suitable means known in the art. For instance, as shown in the illustrated embodiment, the heating device 104 may include a power cord 158 configured to be coupled to the device 104 at its first end 134 for supplying electricity to the heating element 140. Specifically, as shown in the illustrated embodiment, a heater end 160 of the power cord 158 may be configured to be inserted and/or mounted within a cord opening 162 defined through the top of the mounting portion 138 at the first end 134 of the heating device 104 to electrically couple the heating element 140 to the cord 158. Additionally, an opposite, plug end 164 of the power cord 158 may be configured to be electrically coupled to a suitable power source to allow power to be transmitted through the cord 158 to the heating element 140. For instance, as shown in the illustrated embodiment, the plug end 164 may form a suitable electrical plug (e.g., a GFCI plug) for electrically coupling the power cord 158 to an electrical outlet, which may allow the heating device 104 to be powered by an external power source. Alternatively, the plug end 164 of the power cord 158 may be configured to be electrically coupled to a power source associated with the work vehicle 10. For instance, in one embodiment, the plug end 164 may be electrically coupled to a battery or an alternator of the work vehicle 10 for supply power to the heating device 104 via the power cord 158.

As indicated above, the disclosed system 100 may also include a controller 106 communicatively coupled to the heating device 104 for automatically controlling the operation of the device 104 (e.g., by turning the device 104 on and off), thereby allowing for automatic control of the temperature of the exhaust reductant contained within the tank 102. For instance, in several embodiments, the controller 106 may be communicatively coupled to one or more temperature sensors 170, 172 configured to provide the controller with feedback related to one or more tank-related temperatures. Specifically, as shown in FIG. 5, the system 100 may include a first temperature sensor 170 positioned within the tank 102 for monitoring the temperature of the exhaust reductant contained within the tank 102. In addition, the system 100 may include a second temperature sensor 172 for monitoring the ambient air temperature around the tank 102. This second temperature sensor 172 may generally be configured to be positioned at any suitable location relative to the tank 102 that allows for the ambient air temperature to be monitored, such as by mounting the sensor 172 at a location on the exterior of the tank 102 or by mounting the sensor 172 at any other suitable location on and/or within the work vehicle 10. It should be appreciated that, in alternative embodiments, the system 100 may only include a single temperature sensor or may include three or more temperature sensors.

In several embodiments, the controller 106 may be configured to control the operation of the heating device 104 based on the temperature measurements provided by one or more of the temperature sensors 170, 172. For instance, in one embodiment, the controller 106 may be configured to turn the heating device 104 on and off based solely on the temperature measurements associated with the temperature of the exhaust reductant (e.g., the measurements provided by the first sensor 170), such as by turning the heating device 104 on when the temperature of the exhaust reductant reaches or falls below a first temperature threshold and by turning the heating device 104 off when the temperature of the exhaust reductant reaches or exceeds a second, higher temperature threshold. In another embodiment, the controller 106 may be configured to control the operation of the heating device 104 based solely on the ambient air temperature measurements (e.g., the measurements provided by the second sensor 172), such as by turning the heating device 104 on when the ambient air temperature reaches or falls below a first temperature threshold and by turning the heating device 104 off when the ambient air temperature reaches or exceeds a second, higher temperature threshold.

Alternatively, the controller 106 may be configured to control the operation of the heating device 104 based on the temperature measurements provided by both sensors 170, 172. For instance, in one embodiment, the controller 106 may be configured to turn the heating device 104 on and off based primarily on the ambient air temperature measurements. However, in such an embodiment, if the temperature of the exhaust reductant reaches or falls below a given threshold, the controller 106 may be configured to turn the heating device 104 on regardless of the current ambient air temperature. In another embodiment, the controller 106 may be configured to monitor the temperature measurements provided by both sensors 170, 172 and, if either temperature measurement falls below and/or exceeds one or more selected temperature threshold(s), the controller 106 may turn the heating device 104 on and/or off as appropriate.

It should be appreciated the controller 106 may generally comprise any suitable processor-based device known in the art. Thus, in several embodiments, the controller 106 may include one or more processor(s) and associated memory device(s) configured to perform a variety of computer-implemented functions. As used herein, the term "processor" refers not only to integrated circuits referred to in the art as being included in a computer, but also refers to a controller, a microcontroller, microcomputer, a programmable logic controller (PLC), an application specific integrated circuit, and other programmable circuits. Additionally, the memory device(s) of the controller 106 may generally comprise memory element(s) including, but are not limited to, computer readable medium (e.g., random access memory (RAM)), computer readable non-volatile medium (e.g., a flash memory), a floppy disk, a compact disc-read only memory (CD-ROM), a magneto-optical disk (MOD), a digital versatile disc (DVD) and/or other suitable memory elements. Such memory device(s) may generally be configured to store suitable computer-readable instructions that, when implemented by the processor(s), configure the controller 106 to perform various computer-implemented functions, such as the automatic control of the heating device 104 described above. In addition, the controller 106 may also include various other suitable components, such as a communications circuit or module, one or more input/output channels, a data/control bus and/or the like.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

What is claimed is:

1. A system for controlling the temperature of an exhaust reductant used within an exhaust treatment system of a work vehicle, the system comprising:
  a tank including a plurality of walls defining an enclosed volume for containing the exhaust reductant, the tank further including a threaded port defined through a first wall of the plurality of walls and a secondary port defined through one of the plurality of walls, the secondary port having a first crosswise width; and
  an electric heating device extending lengthwise within the tank between a first end and a second end, the electric heating device including a mounting portion at the first end and a heating element extending between the mounting portion and the second end, the mounting portion being configured to be screwed into the threaded port to couple to the electric heating device to the tank, the mounting portion extending from an interior of the tank at least partially through the threaded port, the heating element having a second crosswise width that is less than the first crosswise width where the heating element is inserted into the tank via the secondary port; and
  a controller communicatively coupled to the electric heating device, the controller being configured to control the operation of the electric heating device based on a temperature associated with the tank.

2. The system of claim 1, wherein the threaded port is defined by a threaded insert mounted within the first wall.

3. The system of claim 1, wherein the threaded port defines a third crosswise width that is less than the second crosswise width.

4. The system of claim 1, wherein the heating element defines a length between the mounting portion and the second end of the electric heating device and wherein the tank defines a height, the length corresponding to a distance that is greater than 50% of the height.

5. The system of claim 1, wherein the mounting portion extends fully through the threaded port from the interior of the tank such that a section of the mounting portion is positioned exterior of the tank.

6. The system of claim 1, wherein the mounting portion defines a cord opening at the first end of the heating device, the cord opening configured to receive an end of a power cord for electrically coupling the power cord to the electric heating device.

7. The system of claim 1, further comprising a first sensor located within the tank and configured to measure a temperature of the exhaust reductant contained within the tank, wherein the controller is:
  communicatively coupled further to first sensor and to a second sensor that measures an temperature of ambient air around the tank configured to control operation of the electric heating device based on the temperature of the exhaust reductant contained within the tank; and
  configured to control operation of the electric heating device based on the temperature of the exhaust reductant contained within the tank and on the temperature of the ambient air around the tank.

8. The system of claim 7, wherein controlling, by the controller, operation of the electric heating device comprises:
  determining whether the temperature of the exhaust reductant contained within the tank is below a first temperature threshold;
  responsive to a determination that the temperature of the exhaust reductant contained within the tank is below a first temperature threshold, controlling the electric heating device based only on the temperature of the exhaust reductant contained within the tank; and
  responsive to a determination that the temperature of the exhaust reductant contained within the tank is above the first temperature threshold, controlling the electric heating device based on whether the temperature of the exhaust reductant contained within the tank is above or below a second temperature threshold.

9. A system for controlling the temperature of an exhaust reductant used within an exhaust treatment system of a work vehicle, the system comprising:
a tank defining an enclosed volume for containing the exhaust reductant, the tank including a top wall, a bottom wall and sidewalls extending between the top and bottom walls, the tank defining a height between the top and bottom walls, the tank further including a heater port and secondary port defined through top wall, wherein the heater port comprises a threaded port and the secondary port has a first crosswise width; and
an electric heating device extending lengthwise within the tank between a first end and a second end, the electric heating device including a mounting portion at the first end and a heating element extending between the mounting portion and the second end, the mounting portion being configured to be coupled to the tank via the heater port, the mounting portion extending fully through the heater port from an interior of the tank such that a section of the mounting portion is positioned exterior of the tank, the heating element defining a length between the mounting portion and the second end, the mounting portion being configured to be screwed into the threaded port in order to couple to the electric heating device to the tank, the heating element having a second crosswise width that is less than the first crosswise width where the heating element is inserted into the tank via the secondary port; and
a controller communicatively coupled to the electric heating device, the controller being configured to control the operation of the electric heating device based on a temperature associated with the tank,
wherein the length of the heater element corresponds to a distance that is greater than 50% of the height of the tank.

10. The system of claim 9, wherein the threaded port is defined by a threaded insert mounted within the top wall.

11. The system of claim 9, further comprising an attachment mechanism configured to be coupled the section of the mounting portion extending exterior of the tank so as to retain the electric heating device relative to the tank, the attachment mechanism being positioned entirely on the exterior of the tank.

12. The system of claim 9, wherein the heater port defines a third crosswise width that is less than the second crosswise width.

13. The system of claim 9, wherein the mounting portion defines a cord opening at the first end of the heating device, the cord opening configured to receive an end of a power cord for electrically coupling the power cord to the electric heating device.

14. The system of claim 9, further comprising a first sensor located within the tank and configured to measure a temperature of the exhaust reductant contained within the tank, wherein the controller is:
communicatively coupled further to first sensor and to a second sensor that measures an temperature of ambient air around the tank configured to control operation of the electric heating device based on the temperature of the exhaust reductant contained within the tank; and
configured to control operation of the electric heating device based on the temperature of the exhaust reductant contained within the tank and on the temperature of the ambient air around the tank.

15. The system of claim 14, wherein controlling, by the controller, operation of the electric heating device comprises:
determining whether the temperature of the exhaust reductant contained within the tank is below a first temperature threshold;
responsive to a determination that the temperature of the exhaust reductant contained within the tank is below a first temperature threshold, controlling the electric heating device based only on the temperature of the exhaust reductant contained within the tank; and
responsive to a determination that the temperature of the exhaust reductant contained within the tank is above the first temperature threshold, controlling the electric heating device based on whether the temperature of the exhaust reductant contained within the tank is above or below a second temperature threshold.

16. A system for controlling the temperature of an exhaust reductant used within an exhaust treatment system of a work vehicle, the system comprising:
a tank including a plurality of walls defining an enclosed volume for containing the exhaust reductant, the tank further including a heater port and secondary port each defined through one of the plurality of walls, the heater port defining a first crosswise width and the secondary port defining a second crosswise width, wherein the heater port comprises a threaded port;
a first sensor located within the tank and configured to measure a temperature of the exhaust reductant contained within the tank;
an electric heating device extending lengthwise within the tank between a first end and a second end, the electric heating device including a mounting portion at the first end and a heating element extending between the mounting portion and the second end, the mounting portion being configured to extend from an interior of the tank at least partially through the heater port to couple the electrical heating device to the tank, the heating element defining a third crosswise width, the mounting portion being configured to be screwed into the threaded port in order to couple to the electric heating device to the tank; and
a controller communicatively coupled to the electric heating device, to the first sensor, and to a second sensor that measures an temperature of ambient air around the tank, the controller being configured to control the operation of the electric heating device based on the temperature of the exhaust reductant contained within the tank and on the temperature of the ambient air around the tank,
wherein the third crosswise width is less than the second crosswise width where the heating element is inserted into the tank via the secondary port.

17. The system of claim 16, wherein the threaded port is defined by a threaded insert mounted within the top wall.

18. The system of claim 16, wherein the mounting portion is configured to extend fully through the heater port from the interior of the tank such that a section of the mounting portion extends to an exterior of the tank, further comprising an attachment mechanism configured to be coupled the section of the mounting portion extending to the exterior of the tank so as to retain the electric heating device relative to the tank.

19. The system of claim 16, wherein the mounting portion defines a cord opening at the first end of the heating device, the cord opening configured to receive an end of a power cord for electrically coupling the power cord to the electric heating device.

20. The system of claim 16, wherein controlling, by the controller, operation of the electric heating device comprises:
- determining whether the temperature of the exhaust reductant contained within the tank is below a first temperature threshold;
- responsive to a determination that the temperature of the exhaust reductant contained within the tank is below a first temperature threshold, controlling the electric heating device based only on the temperature of the exhaust reductant contained within the tank; and
- responsive to a determination that the temperature of the exhaust reductant contained within the tank is above the first temperature threshold, controlling the electric heating device based on whether the temperature of the exhaust reductant contained within the tank is above or below a second temperature threshold.

\* \* \* \* \*